United States Patent [19]
Hino et al.

[11] 3,739,866
[45] June 19, 1973

[54] DEVICE FOR DETECTING A ROTATING ANGLE

[75] Inventors: Masamichi Hino, Suita-shi, Osaka; Rinosuke Yoneda, Yamatokiyama-shi, Nara, both of Japan

[73] Assignee: Kubota Tekko Kabushiki Kaisha (Kubota, Ltd.), Osaka, Japan

[22] Filed: Oct. 22, 1971

[21] Appl. No.: 191,796

[52] U.S. Cl. .......... 177/178, 177/210, 177/DIG. 1, 177/DIG. 3, 177/DIG. 6
[51] Int. Cl. ...................... G01g 23/32, G01g 3/14
[58] Field of Search ............. 177/210, 178, DIG. 1, 177/DIG. 3, DIG. 6

[56] References Cited
UNITED STATES PATENTS
2,747,797  5/1956  Beaumont .................... 177/DIG. 1
3,289,777  12/1966  Willyard ............................ 177/178

FOREIGN PATENTS OR APPLICATIONS
92,041   4/1959  Netherlands .................. 177/DIG. 3
583,593  10/1958  Italy ............................... 177/DIG. 1

Primary Examiner—George H. Miller, Jr.
Attorney—E. F. Wenderoth, John E. Lind, V. M. Creedon et al.

[57] ABSTRACT

A device for detecting a rotating angle. The device has a scale which rotates around a center of a fulcrum and on which light shielding sections and light passing sections are arranged. A light source provides light which irradiates the scale. A photoconductive element receives light passed through the scale, and a slit-plate which is arranged between the photoconductive element and the scale further passes light from the light passing sections of the scale to the photoconductive element.

5 Claims, 4 Drawing Figures

DEVICE FOR DETECTING A ROTATING ANGLE

This invention relates to a device for detecting the rotating angle of an object, and especially to a device for detecting the rotating angle of a pendulum of a pendulum-type balance as pulse signals and for displaying it as a weight of the object to be measured.

Conventionally there have been several kinds of methods for detecting the rotating angle of the pendulum in measuring a weight. However, most of them are mechanical ones and so there is a defect that error is often caused by friction of bearings or gears, etc. Therefore an object of the present invention is to provide a device for detecting a rotating angle which eliminates the error caused by mechanical friction as described above. The invention comprises an object, a rotating angle of which is to be detected, a striped scale on which there are arranged light shielding sections and light passing sections and which is installed to said object, a fixed plate having slits thereon and a photoconductive element, wherein said scale is moved together with said rotating object in front of said fixed plate and said photoconductive element detects the intermittence of light through said slit plate and said scale and generates corresponding pulse signals.

Figure 1:
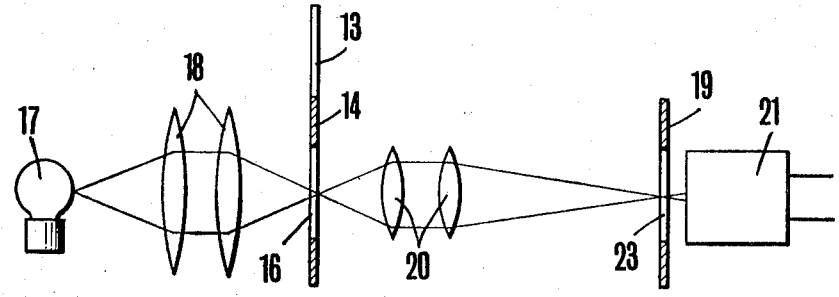
Figure 2:
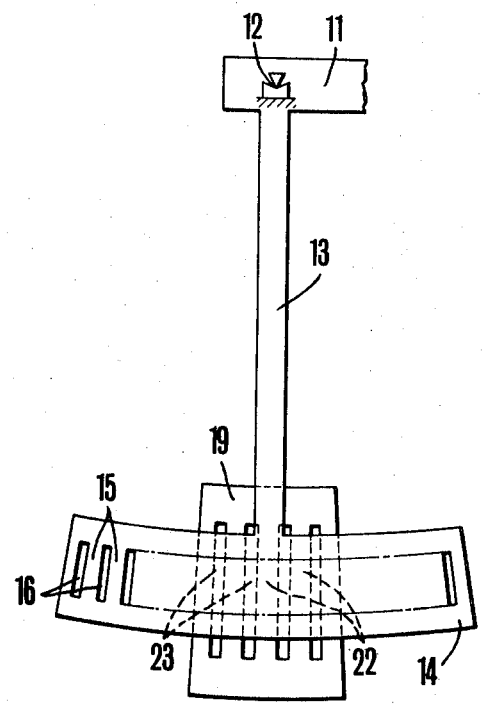
Figure 3:
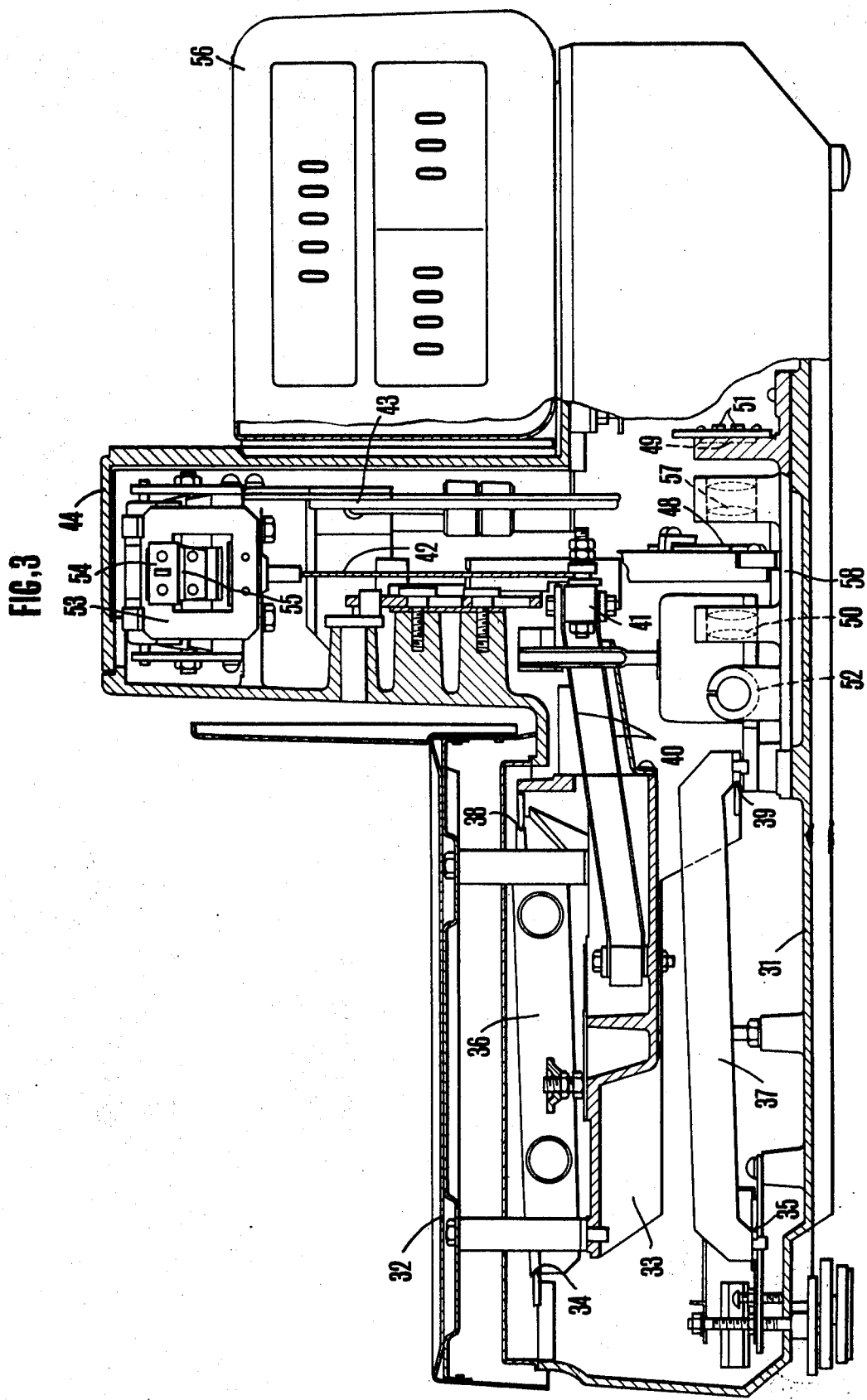
Figure 4:
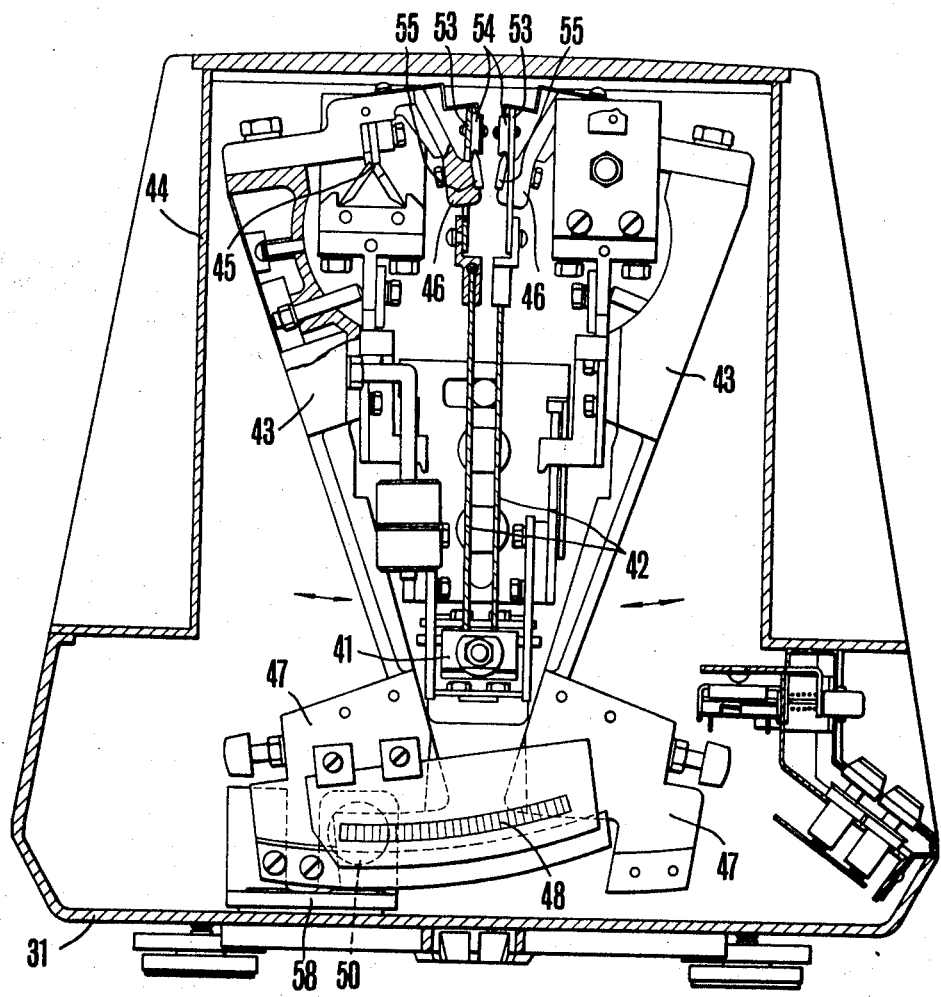

One embodiment of the invention will be described in detail in the following and with reference to the accompanying drawings in which, FIG. 1 is a side sectional view of a part of a device of the invention, for explaining the principle of the detecting device according to the present invention, FIG. 2 is a front view of a main part of the device shown in FIG. 1, FIG. 3 is a side sectional view of a main part of a balance, to which the detecting device of the invention is applied as an example of one embodiment, and FIG. 4 is a front sectional view of the part shown in FIG. 3.

Referring to FIGS. 1 and 2, the reference numeral 11 designates an arm of a balance and 12 designates a fulcrum for supporting said arm. 13 is a rotating member combined with said arm 11, and 14 is a circular scale, the center of which corresponds to said fulcrum 12, which is arranged to the end portion of said rotating member 13. Said scale 14 is provided with light shielding sections 15 and light passing sections 16 alternately in the radius direction with a constant pitch thereon. Said light shielding sections 15 and said light passing sections 16 are arranged alternately in stripes with equal widths. Light from the light source 17 is focussed by a condenser lens 18 and the focussed light passes through the light passing section 16 of the scale. Then, the light is enlarged by an enlarging lens 20 and irradiates a photoconductive element 21 through each of the light passing sections 23 of a fixed slit-plate.

When the slit-plate 19 is apart from the scale 14 as shown in FIG. 1, the lens 20 is arranged so as to focus a striped image of the light shielding sections 15 and the light passing sections 16 of the scale 14 on the slit-plate 19. At that time, the widths of the light passing sections 23 and the light shielding sections 22 of the slit-plate 19 are set to be equal to those of the light parts and the dark parts of the projected image of the scale 14. The photoconductive element 21 has a dimension large enough to receive at the same time all of the light passed through the plurality of light passing sections 23 of the slit-plate 19.

In the device which is arranged as described above, the light radiated from the light source 17 passes through the condenser lens and the light passing section 16 of the scale 14, and the striped pattern by the scale 14 is enlarged by the enlarging lens 20 and focussed on the slit-plate 19, and through the light passing sections 23 of the slit-plate 19, the pattern is irradiated on the photoconductive element 21. The photoconductive element 21 generates an output voltage according to the irradiated amount of light.

Now, a balance is considered. When an object, the weight of which is to be weighed, is loaded on a loading pan which is attached to the arm 11, the rotating member rotates from an original point by a certain angle corresponding to the weight of that object.

At that time, the striped pattern of the light passed through the scale 14 overlaps the striped pattern of the shielding sections 22 and the light passing sections 23 of the slit-plate 19 and passes therethrough. Therefore, when all of the light passed through the light passing section 16 of the scale 14 pass through the light passing sections 23 of the slit-plate 19, the photoconductive element 21 is provided with the maximum amount of light, and when all of the light passed through the light passing sections 16 are shielded by the shielding sections 22, the amount of light irradiated to the photoconductive element 21 becomes minimum. During these two cases, the amount of light irradiated to the photoconductive element 21 changes sinusoidally from a certain maximum amount to minimum.

Accordingly, the output signal from the photoconductive element 21, which corresponds to the amount of light, also becomes a sine wave form. This sine wave signal is converted into pulse signals by a suitable circuit, and by counting the number of these pulse signals by a pulse counter, the angle by which the rotating member 13 rotates from the original point can be detected as the number of the pulse signals.

In the case of a balance where the rotating member 13 goes and returns repeatedly several times until it stops at a certain rotating angle from the original point, there are further provided a slit-plate and a photoconductive element in addition to the slit-plate 19. Each of the slit-plates and the photoconductive elements is arranged a different phase from each other, so as to produce two output signals which are different in phase from each other. Accordingly, the forward and reverse direction of the signals are detected by discriminating these two signals by a phase discriminating circuit, and by adding the forward pulse signals and subtracting the reverse pulse signals by a reversible pulse counter, the number of pulse signals in the forward direction can be counted. Therefore, even if the rotating member goes and returns many times until it stops, a correct rotating angle can be detected.

As described hereinbefore, by focusing the striped pattern of light passed through a plurality of the light passing sections of the movable scale 14, which moves together with the rotating member 13, on a plurality of the light passing sections 23 of the fixed slit-plate 19 and by irradiating the photoconductive element 21 at the same time with a plurality of light passed through the light passing sections 23, the photoconductive element 21 can be provided with a large amount of radiating light so that even one piece of the photoconductive element 21 can generate a large output signal.

Further, since the total amount of light irradiated to the photoconductive element 21 is the sum of the lights passed through the plurality of the light passing sections 16 of the scale 14, there is hardly an effect on the output signal wave form when there are some cracks at the scale 14 or the slit-plate 19 or when there is some error in the pitch of the light passing sections 16 and 23. In addition, any error can be reduced by averaging the errors.

FIGS. 3 and 4 show the construction of a practical balance, as an example, in which the device of the invention is applied.

In the figures, reference numeral 31 designates a chassis of a balance and 32 designates a loading pan for loading an object to be weighed thereon. A yoke 33 combined with the loading pan 32 is supported at weight points 38 and 39 of levers 36 and 37, respectively which are supported at fulcrums 34 and 35 in the chassis 31 and by these the Roberval mechanism is constructed. A pair of leaf springs 40 are fixed to the upper portion of the yoke 33 and are vertically spaced with a suitable interval therebetween. An input member 41 is fixed between the end portions of these leaf springs. To the outside of the input member 41 is fixed a bent portion of an input wire 42, which is bent in a U-shape. A pair of pendulums 43, which correspond to the rotating member 13 shown in FIGS. 1 and 2, are pivotably mounted at a fulcrum 45 in a pendulum mounting member 44 formed at the chassis 31. An obliquely downwards inclined member 46 is formed so as to face the upper portions of each of the pendulums 43, and a weight edge 55 is provided upwardly at the end portion thereof. Square yokes 53 are fixed to the ends of the input wire 42, respectively and an edge receiving member 54 having a V-shaped groove thereon is fixed to the under side of the upper arm of the square yoke 53. The weight edge 55 is put in the V-shaped groove of the member 54 so as to transfer the downward torque applied to the input wire 42 to the inclined member 46 as a rotating torque through the member 54 and the weight edge 55. At the under ends of each pendulum 43, weights 47 are fixed respectively, and a scale 48 is fixed to one of the weights 47 of the pendulum 43. The scale 48 is the same one as the scale 14 shown in FIGS. 1 and 2, and it is made of, for example, a transparent plastic or glass plate on which many opaque striped patterns are formed in a radius direction. On a bottom plate of the chassis 31, there is fixed a yoke 58 to which a fixed slit-plate 49, a condenser lens 50, a photoconductive element 51, a lamp 52, etc. are fixed.

In the balance having a construction as described above, when an object to be weighed is loaded on the loading pan 32, the yoke 33 descends together with the loading pan 32 and accordingly the leaf springs 40 descend, so that the input wire 42 is provided with a downward torque. The reason why the downward movement of the yoke 33 is applied to the input wire 42 through the leaf springs 40 is that when a load is applied abruptly to the yoke the leaf springs 40 are bent and soften the impact load to be applied to the mechanisms subsequent to the input wire 42.

When the downward torque is applied to the input wire 42, the torque is transfered to the inclined member 46 through the square yoke 53, the receiving member 54 and the weight edge 55, and the pair of pendulums 43 combined with the inclined members 46 rotate to the right and left, as shown by the arrows in FIG. 4. Therefore, the scale 48 fixed to the weight 47 of one of the pendulums 43 also rotates, and the light from the lamp 52 is radiated to the photoconductive element 51 through the condenser lens 50, the scale 48, enlarging lens 57 and the slit-plate 49. Then, the photoconductive element 51 generates pulse signals corresponding to the irradiated light thereon, and the pulse are counted by a pulse counter arranged in the chassis 31 and forwarded to a display tube of a display means provided to the chassis 31, so that the pulse signals are displayed at a display means 56 in digital display form.

As described hereinbefore, according to the present invention, the rotating angle can be detected just by irradiating the scale provided on the rotating member with light. Therefore, compared with other devices which slidably contact a detecting member with the rotating member or which combine a mechanical detecting means thereto, there is no error due to mechanical friction in the device of the present invention and as a result very exact detecting is possible.

What we claim is:

1. A device for detecting a rotating angle comprising a scale rotatable around a fulcrum as a center and having alternate light shielding sections and light passing sections, a light source for irradiating said scale, a single photoconductive element for receiving light passed through said scale, and a fixed slit-plate arranged between said photoconductive element and said scale, said split-plate being provided with a plurality of light passing sections and light sheilding sections so as to correspond with at least a part of the light passing sections and light shielding sections of said scale for passing a plurality of beams passed through the rotatable scale to the photoconductive element.

2. A device for detecting a rotating angle as claimed in claim 1 wherein said light shielding sections and said light passing sections of said scale and said slit-plate are of the same width.

3. A device for detecting a rotating angle as claimed in claim 1 wherein said light passing sections and said light shielding sections of said slit-plate are arranged so as to cover the effective light receiving area of the photoconductive element.

4. A device for detecting a rotating angle as claimed in claim 1 wherein a lens is provided between said light source and aid slit-plate for focusing the beams passed through said scale onto said slit-plate.

5. A PENDULUM-type balance including a device for detecting a rotating angle according to claim 1.

* * * * *